(12) United States Patent
Wang

(10) Patent No.: US 10,253,899 B2
(45) Date of Patent: Apr. 9, 2019

(54) FLOW RATE SAFETY VALVE

(71) Applicant: Tengpeng Wang, Taizhou (CN)

(72) Inventor: Tengpeng Wang, Taizhou (CN)

(73) Assignee: Yuhuan Jianglin Plumbing Hose & Parts Co., Ltd., Taizhou (CN)

( * ) Notice: Subject to any disclaimer, the term of this patent is extended or adjusted under 35 U.S.C. 154(b) by 357 days.

(21) Appl. No.: 15/366,046

(22) Filed: Dec. 1, 2016

(65) Prior Publication Data

US 2018/0128392 A1 May 10, 2018

(30) Foreign Application Priority Data

Nov. 8, 2016 (CN) ............................ 2016 1 0981474

(51) Int. Cl.
  *F16K 1/46* (2006.01)
  *F16K 15/14* (2006.01)
  *F16K 17/30* (2006.01)

(52) U.S. Cl.
  CPC ............... *F16K 17/30* (2013.01); *F16K 1/46* (2013.01); *F16K 15/147* (2013.01)

(58) Field of Classification Search
  CPC ......... Y10T 137/7842; Y10T 137/7869; F16K 17/30; F16K 1/46; F16K 15/147
  See application file for complete search history.

(56) References Cited

U.S. PATENT DOCUMENTS

| | | | | |
|---|---|---|---|---|
| 3,741,241 A * | 6/1973 | Jackson | ................... | F16K 17/30 137/504 |
| 3,872,884 A * | 3/1975 | Busdiecker | ............. | F16K 17/30 137/498 |
| 4,068,680 A * | 1/1978 | Sliger | ..................... | F16K 15/04 137/512.1 |
| 4,642,097 A * | 2/1987 | Siposs | ................... | A61M 39/24 137/512.3 |
| 4,725,266 A * | 2/1988 | Siposs | ................... | A61M 39/24 137/512.3 |
| 4,758,224 A * | 7/1988 | Siposs | ................... | A61M 39/24 137/512.3 |
| 6,142,980 A * | 11/2000 | Schalk | ................ | A61M 1/0031 137/512.3 |
| 2016/0319788 A1* | 11/2016 | Bean | ....................... | F16K 31/02 |

FOREIGN PATENT DOCUMENTS

| CN | 100434781 C | 11/2008 |
|---|---|---|
| CN | 201521438 U | 7/2010 |

* cited by examiner

*Primary Examiner* — Marina A Tietjen
*Assistant Examiner* — Frederick D Soski
(74) *Attorney, Agent, or Firm* — Minder Law Group; Willy H. Wong

(57) ABSTRACT

The present flow rate safety valve comprises a valve body, a valve seat, a valve core and a spring. The valve core is an open cylinder. A sealing washer is set up on the front end of the valve core. Part of the rim of the sealing washer contacts the inner wall of the valve body, forming a seal and guiding the valve core in the axial direction of the valve body. A projecting sealing part is arranged on the valve seat, and the inner wall at the rear end of the valve core is a conical surface which extends from the rear end face to the middle part of the valve core and forms a guide for the conical sealing part. Inside an outflow pipe of the valve body, a backflow preventer is arranged in order to prevent the medium backflow.

19 Claims, 4 Drawing Sheets

FLOW RATE SAFETY VALVE

RELATED APPLICATIONS

This application claims benefit of Chinese Patent Application No. CN 2016109814748, filed Nov. 8, 2016.

The applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of Invention

The present invention relates to the technical field of valves, and particularly to a flow rate safety valve.

Related Art

The water supply system is a system that transfers water to the required equipment through pipelines. In the existing water supply system, generally, the water consuming equipment is directly connected to the water supply lines. However, in the water supply system, the flow rate and pressure of water are not always constant, instead, are always changing. When the flow rate and pressure of water in the water supply lines are too large, the water consuming equipment will be easily impacted and damaged, and the water consuming equipment would even leak a lot of water due to the damage.

In regular pipelines, a check valve or a flow rate valve is equipped. A check valve plays a role of one-way transmission, and is generally used to achieve the directional control over pipelines, to avoid the backflow. However, it can not achieve the control over the pressure or flow rate when the pressure or the flow rate increases. A flow rate valve is an automatic balancing valve of the plunger type. It can only control the balance of the flow rate, but can not close the pipeline when the flow rate or the line pressure increases. Therefore, flow rate safety valves appear in the market. They are connected between the pipeline and the water consuming equipment, stabilizing the flow rate in the pipeline and avoiding damages to the water consuming equipment and the resultant heavy leakage of water. One prior art flow rate safety valve comprises a valve body and a connector. A sealing sleeve is arranged inside the valve body. The sealing sleeve is cylindrical and its end is connected to a flow dividing cone. There is a valve core and a spring inside the sealing sleeve, and the spring acts on the valve core and the flow dividing cone. On the valve core, there is a plug which blocks the flow dividing cone when the valve core contacts the flow dividing cone. In this product, the valve core, the spring and part of the flow dividing cone are installed inside the sealing sleeve, which leads to a long sealing sleeve. The friction force due to contact between the valve core and the sealing sleeve is large, and the resistive force is large too. Especially when the sealing sleeve is aging, the movement of the valve core is affected. Secondly, the position of the valve core is limited by the sealing sleeve. When the sealing sleeve ages and deforms, or when the water pressure becomes unstable, the valve core is easy to incline. Being inclined, the valve core can not effectively achieve a seal.

SUMMARY OF THE INVENTION

One objective of one embodiment of the present invention is to avoid the issues stated above in the prior art, and to provide a flow rate safety valve. The technical issue to be resolved is to improve the stability of the flow rate safety valve.

The present invention can be achieved by the following technical proposal:

One embodiment of a flow rate safety valve comprises a valve body with an inflow pipe and an outflow pipe. Inside the valve body, there is a valve seat connecting to the outflow pipe, and a valve core which forms a seal with the valve seat. On the valve seat, a spring is arranged to act on the valve core and to have the valve core detach from the valve seat and approach the inflow pipe. It is characterized in that:

The valve core is an open cylinder and an annular space is formed between the valve core and the inner wall of the valve body. A sealing washer is set up on the front end of the valve core. Part of the rim of the sealing washer contacts the inner wall of the valve body, forming a seal and guiding the valve core in the axial direction of the valve body. A projecting sealing part is arranged on the valve seat, and the inner wall at the rear end of the valve core is a conical surface which extends from the rear end face to the middle part of the valve core and forms a guide for the conical sealing part. Inside the outflow pipe, a backflow preventer is arranged in order to prevent the medium backflow into the inflow pipe from the outflow pipe.

The cylindrical valve core and the annular space formed between the valve core and the valve body are aimed to increase the water flow rate and to improve the flexibility of the movement of the valve core. Meanwhile, the space between the valve core and the valve body is sealed by the sealing washer, and only the rim part of the sealing washer contacts the valve body. This ensures the flexibility of the valve core, and decreases the friction force between the valve core and the valve body. At the same time, by the contact of the rim part, the valve core is guided. This prevents the valve core from inclining or deviating. Further, a guiding conical surface is set up on the other end of the valve core. When the valve core deviates, it will be adjusted to the correct position by the guiding conical surface. Also, when the valve core is adjusted to the correct position by the conical surface, in coordination with the backflow preventing function of the backflow preventer, the conical surface will not be affected by the resistive force of the backflow during the guided adjustment. This further improves the stability, and solves the issue of unstable product sealing performance caused by easily offset valve core due to ever changing in the direction and magnitude of the surge flow.

In the flow rate safety valve, the sealing washer comprises a disk-like connecting part and a conical side. A seal is formed between the connecting part and the outside of the valve core. The large diameter conical end of the side faces the inflow pipe, while the small diameter conical end is connected to the outer rim of the connecting part as a whole. The side is arranged at an angle relative to the inner wall of the valve body, and a seal is formed between the outer surface of the large diameter conical end of the side and the inside wall of the valve body. With the sealing washer of this structure, the valve core can be guided relative to the valve body. In addition, the side is arranged at an angle relative to the inner side wall of the valve body, which can decrease the resistive force when the valve core moves.

In the flow rate safety valve, there is an annular groove at the front end of the valve core, and the connecting part of the sealing washer is installed inside the annular groove. The end face of the large diameter conical end of the side protrudes the front end face of the valve core, and under the action of the spring, a seal is formed between the end face of the large diameter conical end of the side and the inflow pipe end face of the valve body. A seal is formed between the back face of the connecting part and the groove wall on the right side of the annular groove, and a space is left between the front end face of the valve core and the inflow pipe end face of the valve body. With the conic side, when the flow rate is at a normal level, two seals are formed, with the first between the end face of the large diameter conical end and the inflow pipe end face, and the second between the back face and the groove wall on the right side. This improves the sealing performance.

In the flow rate safety valve, when a seal is formed at the conical surface of the valve core and the sealing part on the valve seat, the outside circumference of the sealing washer deforms to a cylindrical surface and forms a surface seal with the valve body. The front face of the connecting part forms a seal with the side wall on the left side of the annular groove, and the inner circumferential wall of the side locates the valve core. Under the impact of the water pressure, the valve core moves toward the valve seat. Due to the confines of the valve seat, the side of the sealing washer deforms to a cylindrical surface, changing the seal with a small sealing area to a seal with a cylindrical and large sealing area. The sealing performance is improved. Meanwhile, being cylindrical, the sealing washer improves the stability of the valve core. Therefore, the more intensive the impact of the water pressure is, the more stable the valve core is.

In the flow rate safety valve, the front end face of the valve core is a flat surface, and the inner bore of the valve core is smaller than that of the inflow pipe. With this structure, the valve core has a sufficient loading surface, and can also increase the contact area between the sealing washer and the valve core.

In the flow rate safety valve, the sealing part of the valve seat is conical, and a second sealing ring is arranged outside the sealing part. The largest diameter of the conical surface faces the sealing part. The largest diameter of the conical surface is larger than the outer diameter of the second sealing ring, and the smallest diameter of the conical surface is less than the outer diameter of the second sealing ring. This structure helps the sealing part on the valve seat guide the valve core. When the valve core deviates, the valve core will be adjusted to the correct position by the sealing washer and the guiding conical surface. This increases the stability of the seal.

In the flow rate safety valve, the sealing part is located in the middle part of the valve body. This location effectively allows the sealing part to effectively enter into the conical surface, precluding the valve core from inclining too much to enter into the conical surface.

In the flow rate safety valve, the valve seat also comprises an annular base. Several connecting poles are arranged between the base and the sealing part. A flow port forms in between two adjacent connecting poles, and the flow ports are connected to the inside of the base. The inflowing direction of the valve core and the inflowing direction of the valve seat are setup in two different directions. This is helpful to reduce the impact from the water flow and the impact on the valve core from the backflow, and improves the stability of the valve core.

In the flow rate safety valve, a seal is achieved between the base and the valve body by the third sealing ring. One end of the spring presses against the base, having the base press against the valve body.

In the flow rate safety valve, the rear end of the backflow preventer is two flexible squeezing surfaces, and the squeezing surfaces are arranged at an angle. The front end of the backflow preventer has a convex and annular convex ring, and a connector is connected to the base by threads. There is an annular collar on the inner wall of the connector, and the convex ring is pressed on the inner wall of the valve body through the collar.

With the fixation patterns of the base and the backflow preventer, the base can also overcome the elastic force from the spring and move a certain distance, allowing the base to have some cushioning capacity.

Compared to the prior art, one embodiment of the present flow rate safety valve has the following advantages:

1. Specific sealing washers are used, with which, when the flow rate is at a normal level, a seal is formed between the side end face of the sealing washer and the inflow pipe end face, a seal is formed between the outer circumferential surface of the side and the inner wall of the valve body, and a seal is formed between the back face of the groove and the connecting part of the sealing washer. These three seals ensure a good sealing performance.

2. Since the seal between the outer circumferential surface of the side and the inner wall of the valve body is nearly a linear seal. The valve core has a good mobility. The seal guides and limits the valve core to some extent, and prevents the valve core from deviating from the axial direction of the valve body. Especially, under the impact of the water flow, the deformation of the sealing washer improves the sealing performance, and improves the guidance capacity to the valve core. In coordination with the valve core, the conical guiding structure of the valve seat, and the backflow preventing function of the backflow preventer, it allows the valve core to move along the axial direction of the valve seat stably, under large impact of the water flow. The stability is high.

DETAILED DESCRIPTION OF THE INVENTION

The embodiments of this invention will be described below and the technical solutions of the invention will be further illustrated in connection with the accompanying figures. However, the present invention shall not be limited to these embodiments.

Figure 1:
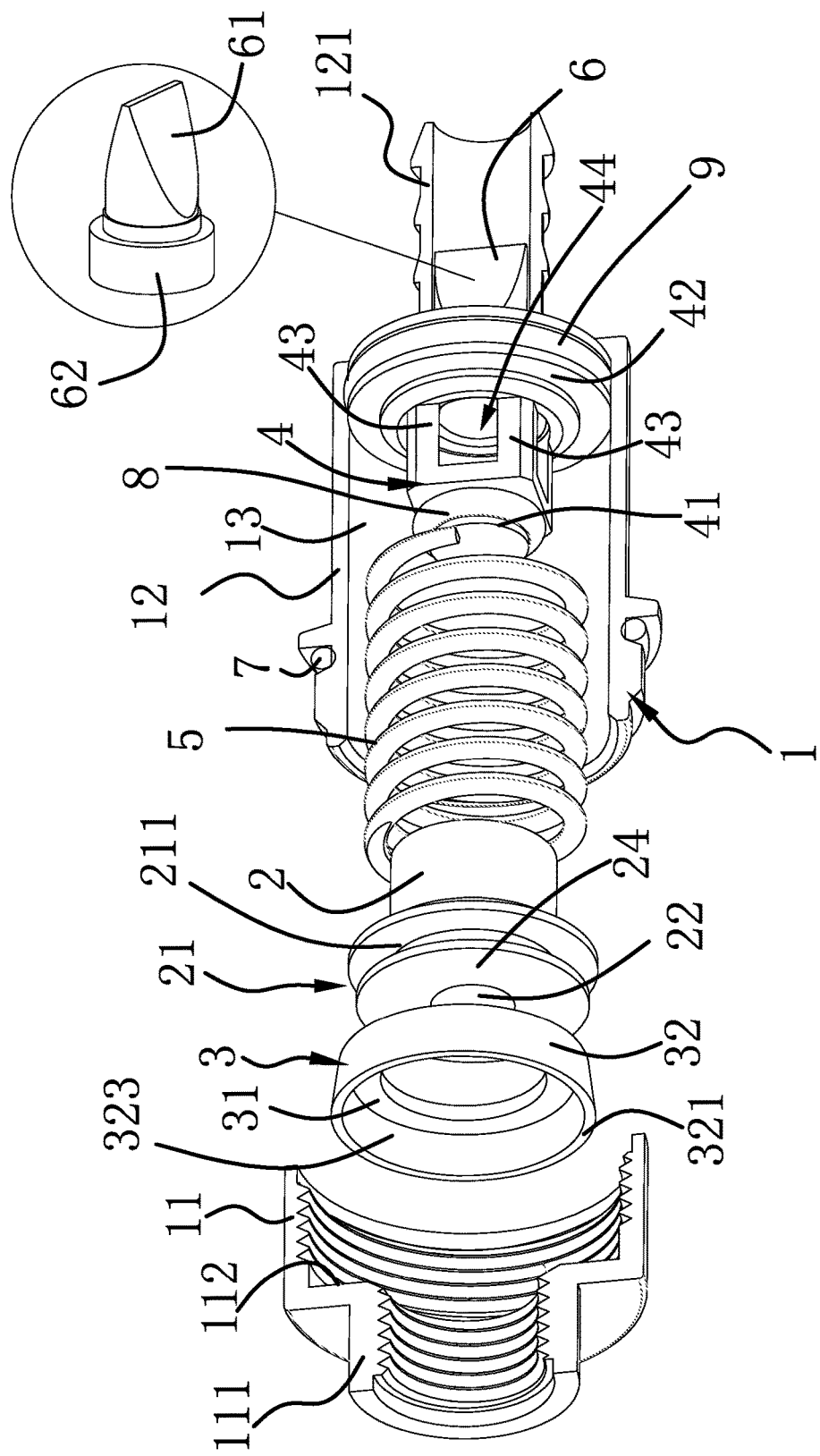
FIG. 1 is an exploded and partially sectional view of one embodiment of the present flow rate safety valve.

As shown in FIG. 1, one embodiment of the present flow rate safety valve comprises a valve body (1), valve core (2), a sealing washer (3), a valve seat (4), a spring (5) and a backflow preventer (6) which prevents the medium backflow. A seal is formed between the valve body (1) and the valve core (2) by the sealing washer (3), and a seal between the valve seat (4) and the valve core (2) can also be formed. The spring (5) is arranged on the valve seat (4) and acts on the valve core (2), having the valve core (2) detach from the valve seat (4) and connecting the valve core (2) to the valve seat (4).

Figure 2:
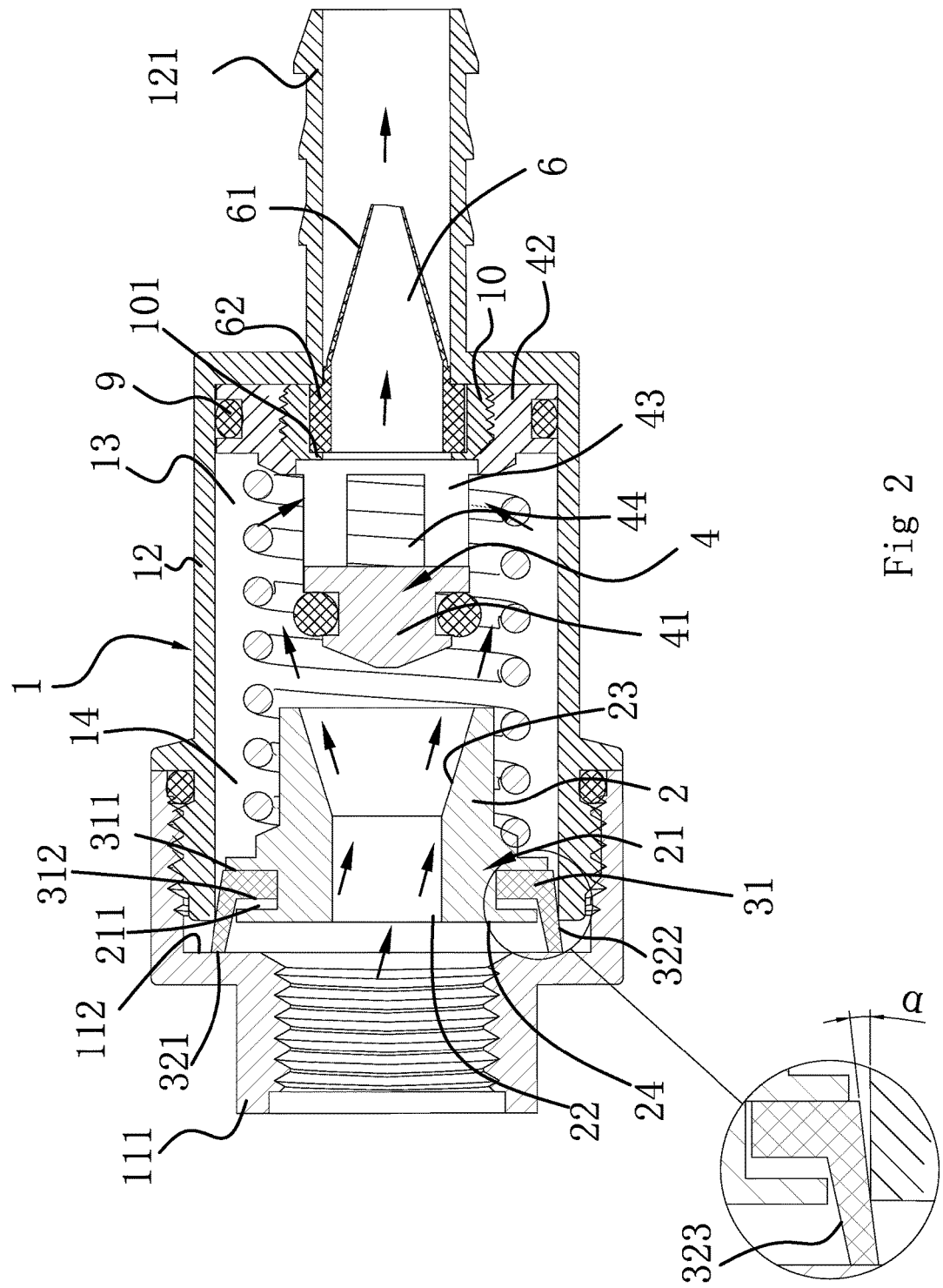
FIG. 2 is the sectional schematic view of one embodiment of the present flow rate safety valve. The state shown in the figure is the state at a normal flow rate.

Combined with FIG. 2, specifically, the valve body (1) comprises a bonnet cover (11) and a cylindrical cylinder (12). One end of the cylinder (12) has an outflow pipe (121) of the quick-plug structure, and the other end of the cylinder (12) has an external thread. There is an inflow pipe (111) on the bonnet cover (11). The inner wall of the bonnet cover (11) has an internal thread. The cylinder (12) is connected to the bonnet cover (11) by threads, and forms the inner cavity (13) of the valve body (1). The space between the valve body (1) and the bonnet cover (11) is sealed by the first sealing ring (7).

The direction is defined according to the placement state of the flow rate safety valve shown in FIG. 2. The side next to the inflow pipe (111) is the front end or left end of the flow rate safety valve, and the side next to the outflow pipe (121) is the rear end or right end. In FIG. 1 and FIG. 2, the valve core (2) is an open cylinder. There is a projecting convex rim (21) on the front end of the valve core (2). The outer diameter of the convex rim (21) is larger than the inner diameter of the inflow pipe (111), and the diameter of the inner bore (22) of the valve core (2) is smaller than the inner diameter of the inflow pipe (111). An annular groove (211) is designed on the convex rim (21). The inner wall at the rear end of the valve core (2) is a conical surface (23) which extends from the rear end face to the middle part of the valve core (2) and is used as guidance. The small diameter of the conical surface (23) smoothly transits to the diameter of the inner bore (22) at the front end of the valve core (2). The large diameter of the conical surface (23) faces the valve seat (4). After the valve core (2) is installed inside the inner cavity (13) of the valve body (1), an annular space (14) is formed between the valve core (2) and the inner wall of the cylinder (12) of the valve body (1), so that the valve core (2) can move smoothly.

The sealing washer (3) is arranged at the front end of the valve core (2), comprising the connecting part (31) of an annular and disk shape and the conical side (32). The small diameter conical end of the side (32) is connected to the outer rim of the connecting part (31) as a whole. The large diameter conical end of the side (32) faces the inflow pipe (111), and the side (32) is arranged at an angle relative to the inner wall of the cylinder (12) of the valve body (1). The interior angle α between the inner wall of the cylinder (12) and the outer circumferential surface (322) of the side (32) is within the range of 5-30 degrees, and the optimal interior angle α is within the range of 10-20 degrees. The connecting part (31) of the sealing washer (3) is installed inside the annular groove (211), and the side (32) of the sealing washer (3) encloses the front end of the valve core (2). The front end face (24) of the valve core (2) is a flat surface. The sealing end face (321) of the large diameter conical end of the side (32) protrudes the front end face (24) of the valve core (2). Under the action of the spring (5), specifically as shown in FIG. 2, a seal is formed between the sealing end face (321) of the large diameter conical end of the side (32) and the inflow pipe end face (112) of the valve body (1). A seal is formed between the back face (311) of the connecting part (31) and the groove wall on the right side of the annular groove (211), and a space is left between the front end face (24) of the valve core (2) and the inflow pipe end face (112) of the valve body (1). Meanwhile, part of the outer circumferential surface (322) of the side (32) contacts the cylinder (12) and forms a seal. By this means, when the flow rate is at a normal level, the sealing washer (3) locates the valve core (2). This prevents the valve core (2) from inclining and prevents it from breaking the seal.

Figure 3:
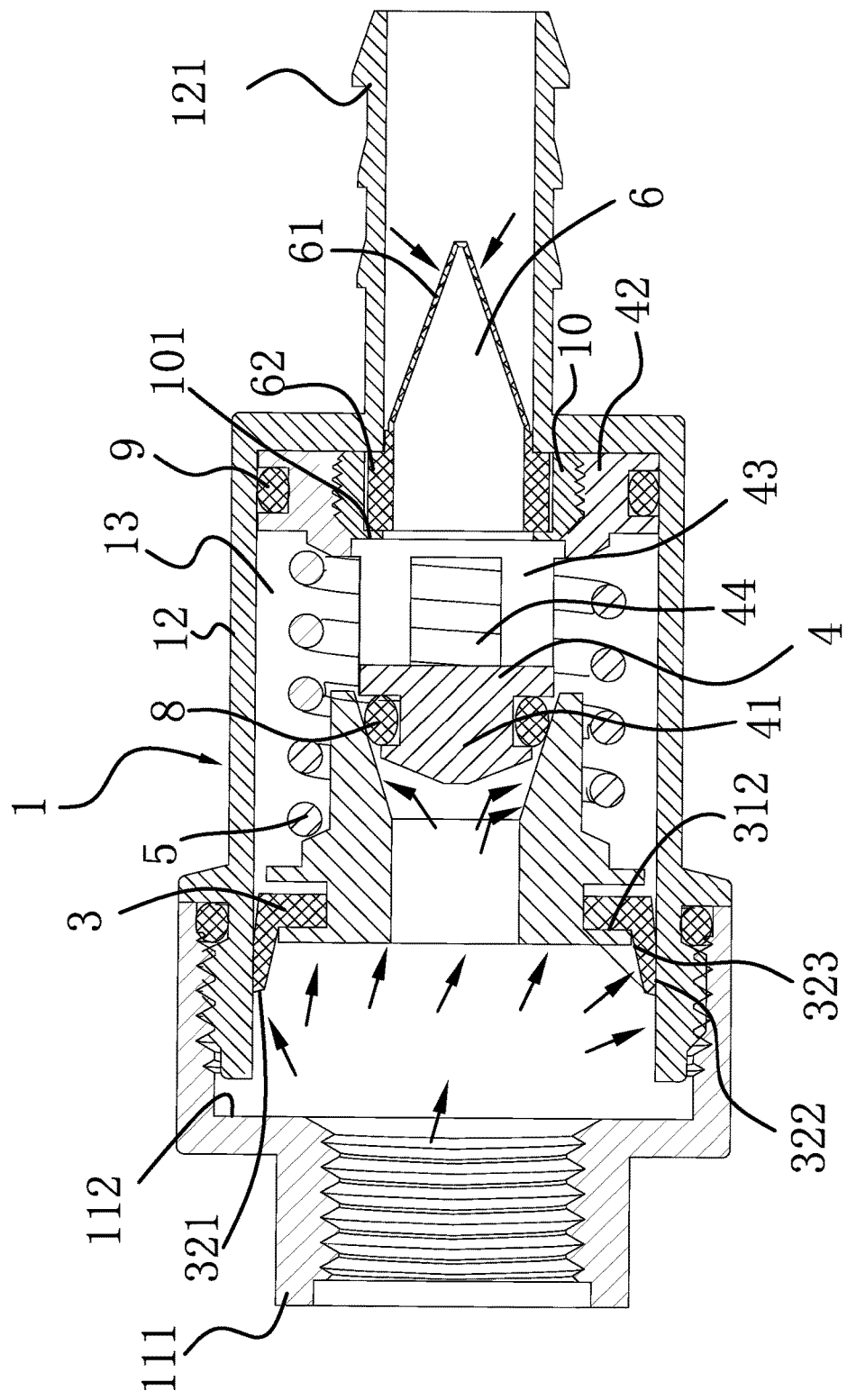
FIG. 3 is the sectional schematic view of one embodiment of the present flow rate safety valve. The state shown in the figure is the state when the valve core and the valve seat are sealed under the impact of the water flow.

As shown in FIG. 3, when a seal is formed between the conical surface (23) of the valve core (2) and the sealing part (41) on the valve seat (4), the outer circumferential surface (322) of the side (32) of the sealing washer (3) deforms to a cylindrical surface and forms a surface seal with the valve body (1). The front face (312) of the connecting part (31) forms a seal with the side wall on the left side of the annular groove (211), and the inner circumferential wall (323) of the side (32) locates the valve core (2). The side (32) of the sealing washer (3), deformed to a cylinder, can guide the valve core (2) in the axial direction of the valve body (1). In order to further ensure that the valve core (2) is stable and will not incline, a projecting sealing part (41) is arranged on the valve seat (4). The sealing part (41) is located in the middle part of the valve body (1), and is conical. A second sealing ring (8) is arranged outside the sealing part (41). The largest diameter of the conical surface (23) faces the sealing part (41). The largest diameter of the conical surface (23) is larger than the outer diameter of the second sealing ring (8), and the smallest diameter of the conical surface (23) is less than the outer diameter of the second sealing ring (8). Therefore, during the movement of the valve core (2), the guidance by the deformed cylindrical surface and the conical surface (23) ensures that the valve core (2) moves in the axial direction of the valve seat (1). Before a seal is formed between the valve core (2) and the valve seat (4), in coordination with the backflow preventer (6), the impact of the backflow to the movement of the valve core (2) is further avoided. After the seal is formed between the valve core (2) and the valve seat (4), the valve seat locates the rear end of the valve core (2), and the deformed cylinder locates the front end of the valve core (2). This ensures that the more intensive the impact of the water flow is, the more stable the valve core (2) is.

Figure 4:
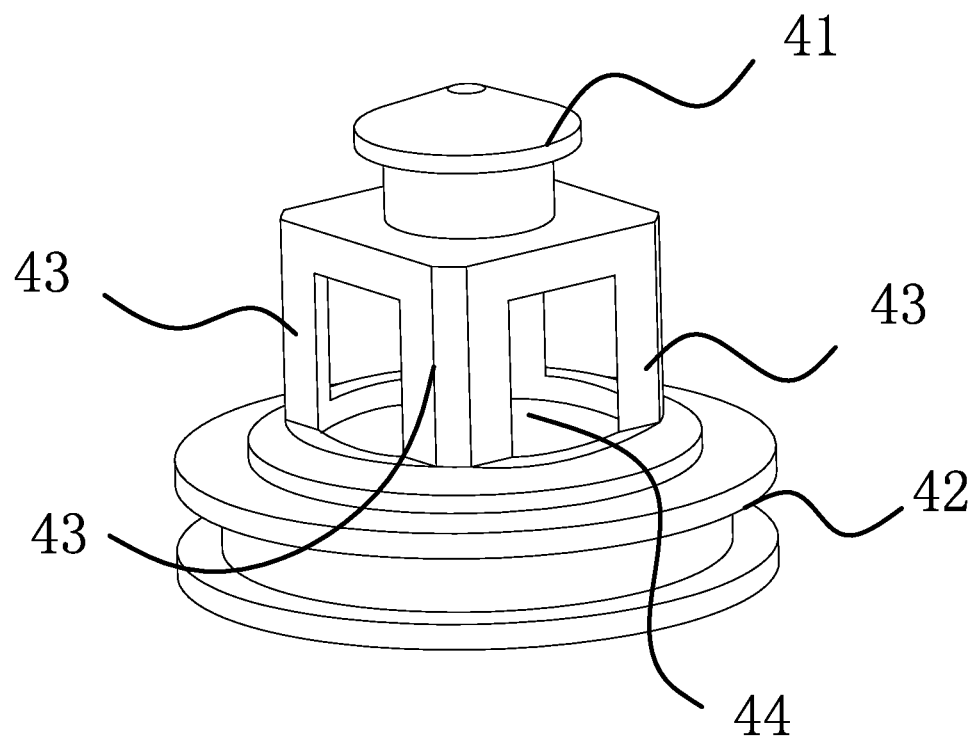
FIG. 4 is the perspective schematic view of one embodiment of the valve seat.

As shown in FIG. 4, one embodiment of the valve seat (4) also comprises an annular base (42). Four connecting poles (43) are arranged between the base (42) and the sealing part (41). A flow port (44) forms in between two adjacent connecting poles (43), and the flow ports (44) are connected to the inside of the base (42). As shown in FIG. 2 and FIG. 3, the space between the base (42) and the valve body (1) is sealed by the sealing ring (9). One end of the spring (5) presses against the base (42), having the base (42) press against the valve body (1). The rear end of the backflow preventer (6) is two flexible squeezing surfaces (61), and the squeezing surfaces (61) are arranged at an angle. The front end of the backflow preventer (6) has a convex and annular convex ring (62), and a connector (10) is connected inside the base by threads. There is an annular collar (101) on the inner wall of the connector (10), and the convex ring (62) is pressed on the inner wall of the valve body (1) through the collar (101).

The operation of one embodiment of the present flow rate safety valve is as follows: when the flow rate is at a normal level, the water enters into the inflow pipe (111). Since a seal is formed between the valve core (2) and the valve body (1) by the sealing washer (3), water from the inflow pipe (111) can only pass through the cylindrical valve core (2) and then enter into the valve seat (4). Then, water flows out the outflow pipe (121) from the valve seat (4). The flow is indicated by arrows as shown in FIG. 2. Even if a water flow at an angle enters into the inflow pipe (111), the impact of the water flow will be reduced after the conical surface (23) at the rear end of the valve core (2) diverts the flow. At the same time, the inflowing direction of the valve core (2) and the inflowing direction of the valve seat (4) are setup in two different directions. This reduces the impact from the water flow, and improves the stability of the valve core (2).

When the pressure difference between the inflow pipe (111) and the outflow pipe (121) increases, namely, when the water consuming equipment at the outflow pipe (121) heavily leaks water or when intensive flow impact acts in the inflow pipe (111), the valve core (2) overcomes the elastic force from the spring, forming a seal between the conical surface (23) of the valve core (2) and the sealing part (41) on the valve seat (4). In addition, the space between the valve core (2) and the valve body (1) is always sealed. Therefore, the connection between the inflow pipe (111) and the outflow pipe (121) is closed, which prevents the leakage from the water consuming equipment. In the situation as shown in FIG. 3, the water flow enters at an angle. The impact force on one side is larger than that on the other side; however, since the valve seat (4) locates the rear end of the valve core (2), and the deformed cylinder locates the front end of the valve core (2), the valve core (2) is still stable.

The description of the preferred embodiments thereof serves only as an illustration of the invention. It will be understood by those skilled in the art that various changes or supplements in form and details may be made therein without departing from the scope of the invention as defined by the appended claims.

LIST OF REFERENCE NUMERALS

1 Valve Body
11 Bonnet Cover
111 Inflow Pipe
112 Inflow Pipe End Face
12 Cylinder
121 Outflow Pipe
13 Inner Cavity
14 Annular Space
2 Valve Core
21 Convex Rim
211 Annular Groove
22 Inner Bore
23 Conical Surface
24 Front End Face
3 Sealing Washer
31 Connecting Part
311 Back Face
312 Front Face
32 Side
321 Sealing End Face
322 Outer Circumferential Surface
323 Inner Circumferential Wall
4 Valve Seat
41 Sealing Part
42 Base
43 Connecting Pole
44 Flow Port
5 Spring
6 Backflow Preventer
61 Squeezing Surface
62 Convex Ring
7 First Sealing Ring
8 Second Sealing Ring
9 Third Sealing Ring
10 Connector
101 Collar
α Interior Angle

What is claimed is:

1. A flow rate safety valve comprising:
a valve body (1) with an inflow pipe (111) and an outflow pipe (121);
a valve seat (4) inside the valve body (1), the valve seat (4) connecting to the outflow pipe (121);
a valve core (2) that forms a seal with the valve seat (4); and
a spring (5) on the valve seat (4), the spring (5) arranged to act on the valve core (2) and arranged to have the valve core (2) detach from the valve seat (4) and approach the inflow pipe (111);
wherein the valve core (2) is an open cylinder and an annular space (14) is formed between the valve core (2) and an inner wall of the valve body (1);
wherein a sealing washer (3) is set up on a front end of the valve core (2);
wherein part of a rim of the sealing washer (3) contacts the inner wall of the valve body (1), forming a seal and guiding the valve core (2) in an axial direction of the valve body (1);
wherein a projecting sealing part (41) is arranged on the valve seat (4), and an inner wall at a rear end of the valve core (2) is a conical surface (23) that extends from a rear end face to a middle part of the valve core (2) and forms a guide for the conical sealing part (41); and
wherein inside the outflow pipe (121), a backflow preventer (6) is arranged in order to prevent medium from flowing back into the inflow pipe (111) from the outflow pipe (121).

2. The flow rate safety valve as claimed in claim 1 wherein
the sealing washer (3) comprises a disk-like connecting part (31) and a conical side (32);
wherein a seal is formed between the connecting part (31) and the valve core (2);
wherein a large diameter conical end of the side (32) faces the inflow pipe (111), while a small diameter conical end is connected to an outer rim of the connecting part (31) as a whole; and
wherein the side (32) is arranged at an angle relative to the inner wall of the valve body (1), and a seal is formed between an outer circumferential surface (322) of the large diameter conical end of the side (32) and the valve body (1).

3. The flow rate safety valve as claimed in claim 2 wherein
there is an annular groove (211) at a front end of the valve core (2), and the connecting part (31) of the sealing washer (3) is installed inside the annular groove (211);
wherein a sealing end face (321) of the large diameter conical end of the side (32) protrudes a front end face (24) of the valve core (2), and under an action of the spring (5), a seal is formed between the sealing end face (321) of the large diameter conical end of the side (32) and an inflow pipe end face (112) of the valve body (1); and
wherein a seal is formed between a back face (311) of the connecting part (31) and a groove wall on a right side of the annular groove (211), and a space is left between the front end face (24) of the valve core (2) and the inflow pipe end face (112) of the valve body (1).

4. The flow rate safety valve as claimed in claim 3 wherein
when a seal is formed between the conical surface (23) of the valve core (2) and the sealing part (41) on the valve seat (4), the outer circumferential surface (322) of the side (32) of the sealing washer (3) deforms to a cylindrical surface and forms a seal with the valve body (1); and
wherein a front face (312) of the connecting part (31) forms a surface seal with a side wall on a left side of the annular groove (211).

5. The flow rate safety valve as claimed in claim 4 wherein
a front end face (24) of the valve core (2) is a flat surface (4c), and a diameter of an inner bore (22) of the valve core (2) is smaller than an inner diameter of the inflow pipe (111).

6. The flow rate safety valve as claimed in claim 5 wherein
the sealing part (41) of the valve seat (4) is conical, and a second sealing ring (8) is arranged outside the sealing part (41);
wherein a largest diameter of the conical surface (23) faces the sealing part (41); and
wherein the largest diameter of the conical surface (23) is larger than an outer diameter of the second sealing ring (8), and a smallest diameter of the conical surface (23) is less than an outer diameter of the second sealing ring (8).

7. The flow rate safety valve as claimed in claim 6 wherein
the sealing part (41) is located in a middle part of the valve body (1).

8. The flow rate safety valve as claimed in claim 1 wherein
the valve seat (4) also comprises an annular base (42);
wherein several connecting poles (43) are arranged between the base (42) and the sealing part (41); and
wherein a flow port (44) forms between two adjacent connecting poles (43), and the flow ports (44) are connected to an inside of the base (42).

9. The flow rate safety valve as claimed in claim 8 wherein
a seal is achieved between the base (42) and the valve body (1) by a third sealing ring (9); and
wherein one end of the spring (5) presses against the base (42), having the base (42) press against the valve body (1).

10. The flow rate safety valve as claimed in claim 9 wherein
a rear end of the backflow preventer (6) comprises two flexible squeezing surfaces (61), and the squeezing surfaces (61) are arranged at an angle;
wherein a front end of the backflow preventer (6) has a convex and annular convex ring (62), and a connector (10) is connected to the base by threads; and
wherein there is an annular collar (101) on an inner wall of the connector (10), and the convex ring (62) is pressed on an inner wall of the valve body (1) through the collar (101).

11. The flow rate safety valve as claimed in claim 2 wherein a front end face (24) of the valve core (2) is a flat surface (4c), and a diameter of an inner bore (22) of the valve core (2) is smaller than an inner diameter of the inflow pipe (111).

12. The flow rate safety valve as claimed in claim 3 wherein
the front end face (24) of the valve core (2) is a flat surface (4c), and a diameter of an inner bore (22) of the valve core (2) is smaller than an inner diameter of the inflow pipe (111).

13. The flow rate safety valve as claimed in claim 4 wherein
the front end face (24) of the valve core (2) is a flat surface (4c), and a diameter of an inner bore (22) of the valve core (2) is smaller than an inner diameter of the inflow pipe (111).

14. The flow rate safety valve as claimed in claim 2 wherein
the sealing part (41) of the valve seat (4) is conical, and a second sealing ring (8) is arranged outside the sealing part (41);
wherein a largest diameter of the conical surface (23) faces the sealing part (41); and
wherein the largest diameter of the conical surface (23) is larger than an outer diameter of the second sealing ring (8), and a smallest diameter of the conical surface (23) is less than an outer diameter of the second sealing ring (8).

15. The flow rate safety valve as claimed in claim 14 wherein
the sealing part (41) is located in a middle part of the valve body (1).

16. The flow rate safety valve as claimed in claim 3 wherein
the sealing part (41) of the valve seat (4) is conical, and a second sealing ring (8) is arranged outside the sealing part (41);
wherein a largest diameter of the conical surface (23) faces the sealing part (41); and
wherein the largest diameter of the conical surface (23) is larger than an outer diameter of the second sealing ring (8), and a smallest diameter of the conical surface (23) is less than an outer diameter of the second sealing ring (8).

17. The flow rate safety valve as claimed in claim 16 wherein
the sealing part (41) is located in a middle part of the valve body (1).

18. The flow rate safety valve as claimed in claim 4 wherein
the sealing part (41) of the valve seat (4) is conical, and a second sealing ring (8) is arranged outside the sealing part (41);
wherein a largest diameter of the conical surface (23) faces the sealing part (41); and
wherein the largest diameter of the conical surface (23) is larger than an outer diameter of the second sealing ring (8), and a smallest diameter of the conical surface (23) is less than an outer diameter of the second sealing ring (8).

19. The flow rate safety valve as claimed in claim 18 wherein
the sealing part (41) is located in a middle part of the valve body (1).

* * * * *